United States Patent
Kimura et al.

(10) Patent No.: US 7,797,150 B2
(45) Date of Patent: Sep. 14, 2010

(54) TRANSLATION SYSTEM USING A TRANSLATION DATABASE, TRANSLATION USING A TRANSLATION DATABASE, METHOD USING A TRANSLATION DATABASE, AND PROGRAM FOR TRANSLATION USING A TRANSLATION DATABASE

(75) Inventors: Shunichi Kimura, Ashigarakami-gun (JP); Hiroki Yoshimura, Ashikaragami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1037 days.

(21) Appl. No.: 11/223,009

(22) Filed: Sep. 12, 2005

(65) Prior Publication Data
US 2006/0206305 A1 Sep. 14, 2006

(30) Foreign Application Priority Data
Mar. 9, 2005 (JP) ............................. 2005-065962

(51) Int. Cl.
*G06F 17/20* (2006.01)
(52) U.S. Cl. ....................................................... 704/8
(58) Field of Classification Search ........................ None
See application file for complete search history.

(56) References Cited

U.S. PATENT DOCUMENTS

| 4,814,988 | A | * | 3/1989 | Shiotani et al. ................. 704/5 |
| 4,953,088 | A | * | 8/1990 | Suzuki et al. ................... 704/3 |
| 5,267,156 | A | * | 11/1993 | Nomiyama ..................... 704/10 |
| 5,497,319 | A | * | 3/1996 | Chong et al. .................... 704/2 |
| 5,535,120 | A | * | 7/1996 | Chong et al. .................... 704/3 |
| RE35,464 | E | * | 2/1997 | Suzuki et al. ................... 704/2 |
| 5,845,143 | A | * | 12/1998 | Yamauchi et al. .............. 704/2 |
| 6,219,646 | B1 | * | 4/2001 | Cherny ........................ 704/277 |
| 6,463,404 | B1 | * | 10/2002 | Appleby ......................... 704/9 |
| 7,054,803 | B2 | * | 5/2006 | Eisele ............................. 704/2 |
| 7,295,964 | B2 | * | 11/2007 | Suzuki ........................... 704/2 |
| 7,418,390 | B1 | * | 8/2008 | Jokipii ...................... 704/270.1 |
| 2003/0120478 | A1 | * | 6/2003 | Palmquist ...................... 704/3 |
| 2003/0139920 | A1 | * | 7/2003 | Abir ............................... 704/2 |
| 2003/0200078 | A1 | * | 10/2003 | Luo et al. ....................... 704/2 |
| 2004/0039563 | A1 | * | 2/2004 | Suzuki ........................... 704/2 |
| 2005/0197825 | A1 | * | 9/2005 | Hagerman et al. ............. 704/2 |
| 2007/0112553 | A1 | * | 5/2007 | Jacobson ....................... 704/2 |
| 2008/0040095 | A1 | * | 2/2008 | Sinha et al. .................... 704/2 |

* cited by examiner

FOREIGN PATENT DOCUMENTS

JP A 02-195479 8/1990

*Primary Examiner*—Michael N Opsasnick
(74) *Attorney, Agent, or Firm*—Oliff & Berridge, PLC

(57) ABSTRACT

A translation system comprises an image reading unit that optically reads an image of a manuscript and generates image data; an inputting unit that inputs a translation target language; a character recognizing unit that generates an original text by performing a character recognition process on the image data generated by the image reading unit; a translation text database in which are associated and stored translation texts, language identifiers which specify the languages in which the translation texts are written, and document identifiers which specify the contents of the translation texts; an extracting unit that extracts the document identifier which specifies the content of the original text from the original text; a searching unit that searches the translation text database for a translation text associated with a document identifier identical to the document identifier extracted from the original text by the extracting unit and a language identifier identical to the language identifier which specifies the translation target language input by the inputting unit; and an outputting unit that outputs the translation text searched by the searching unit.

11 Claims, 4 Drawing Sheets

FIG. 5
| DOCUMENT IDENTIFIER | LANGUAGE | TRANSLATION TEXT |
|---|---|---|
| A000001 | JP | これはペンです。このペンは… |
| A000001 | EN | This is a pen. This pen is … |
| A000001 | DE | Es gibt ein Feder. …… |
| A000001 | FR | … |
| A000001 | … | … |
| A000002 | JP | … |
| … | … | … |
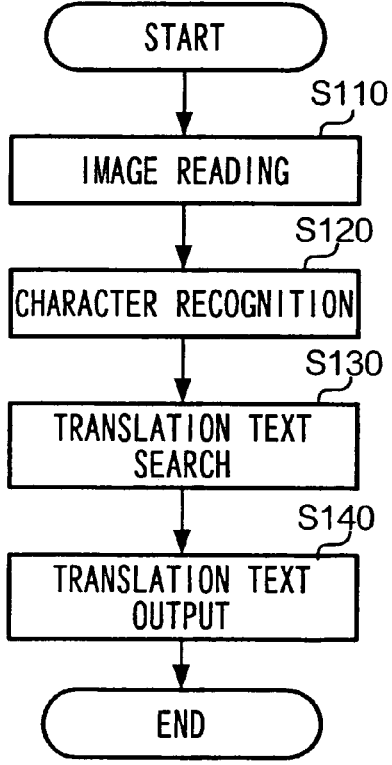
FIG. 6
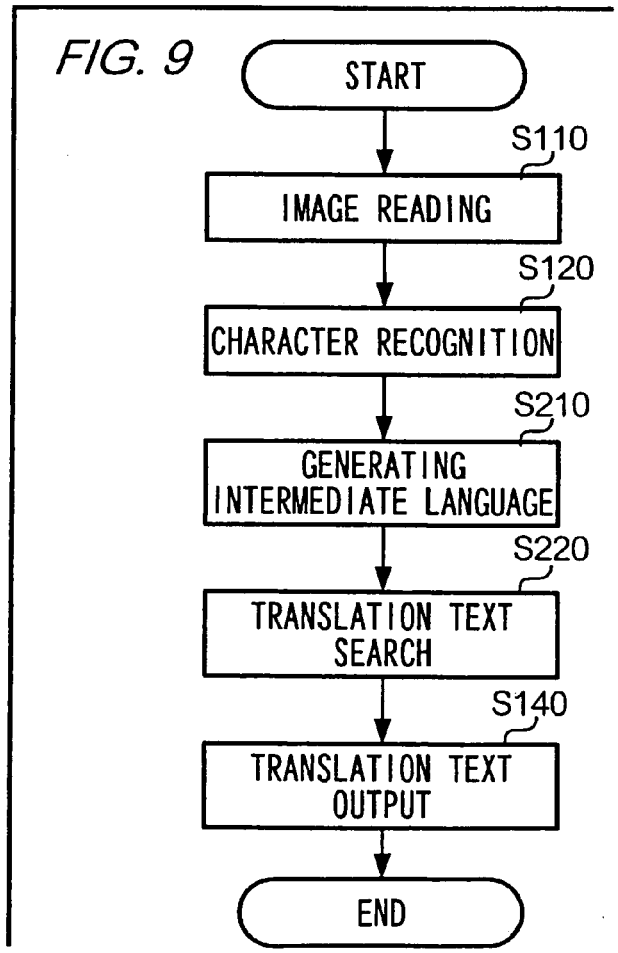
FIG. 9

| INTERMEDIATE LANGUAGE TEXT | LANGUAGE | TRANSLATION TEXT |
|---|---|---|
| Xxx yyyy zz | JP | これはペンです。このペンは... |
| Xxx yyyy zz | EN | This is a pen. This pen is ··· |
| Xxx yyyy zz | DE | Es gibt ein Feder. ······ |
| Xxx yyyy zz | FR | ··· |
| Xxx yyyy zz | ··· | ··· |
| Aa bb cccc | JP | ··· |
| ··· | ··· | ··· |
| ⋮ | ⋮ | ⋮ |

TRANSLATION SYSTEM USING A TRANSLATION DATABASE, TRANSLATION USING A TRANSLATION DATABASE, METHOD USING A TRANSLATION DATABASE, AND PROGRAM FOR TRANSLATION USING A TRANSLATION DATABASE

BACKGROUND OF THE INVENTION

1. Field of the Invention

The present invention relates to automatic translation systems.

2. Description of the Related Art

The demand for translation from one language (e.g., English) to another language (e.g., Japanese) has grown due to the spread of international activities such as the global transfer of information, economic activities, and so on in recent years. However, having a professional (a translator) do a translation is generally expensive and time-consuming, and for this reason demand for automatic translation (machine translation) devices which automatically translate using a computer or other such machines has grown.

SUMMARY OF THE INVENTION

The present invention provides a translation system including: an image reading section that optically reads an image of a manuscript and generates image data; an inputting section that inputs a translation target language; a character recognizing section that generates an original text by performing a character recognition process on the image data generated by the image reading section; an original text storing section that stores the original text generated by the character recognizing section and language identifiers which specify the translation target language input by the inputting section; a translation text database in which are associated and stored translation texts, language identifiers which specify languages in which the translation texts are written, and document identifiers which specify content of the translation texts; an extracting section that extracts the document identifier which specifies the content of the original text from the original text stored in the original text storing section; a searching section that searches the translation text database for a translation text associated with a document identifier identical to the document identifier extracted from the original text by the extracting section and a document identifier and a language identifier identical to the language identifier stored by the original text storing section; and an outputting section that outputs the translation text searched by the searching section.

BRIEF DESCRIPTION OF THE DRAWINGS

Embodiments of the present invention will be described in detail based on the following figures, wherein:

FIG. 5 is a diagram showing an example of content of a translation text database DB1;

FIG. 6 is a flowchart showing operation of the translation system 1;

FIG. 9 is a flowchart showing operation of a translation system 2.

DETAILED DESCRIPTION OF THE INVENTION

Below follows a description of an embodiment according the present invention, with reference to the drawings.

First Embodiment

Figure 1:
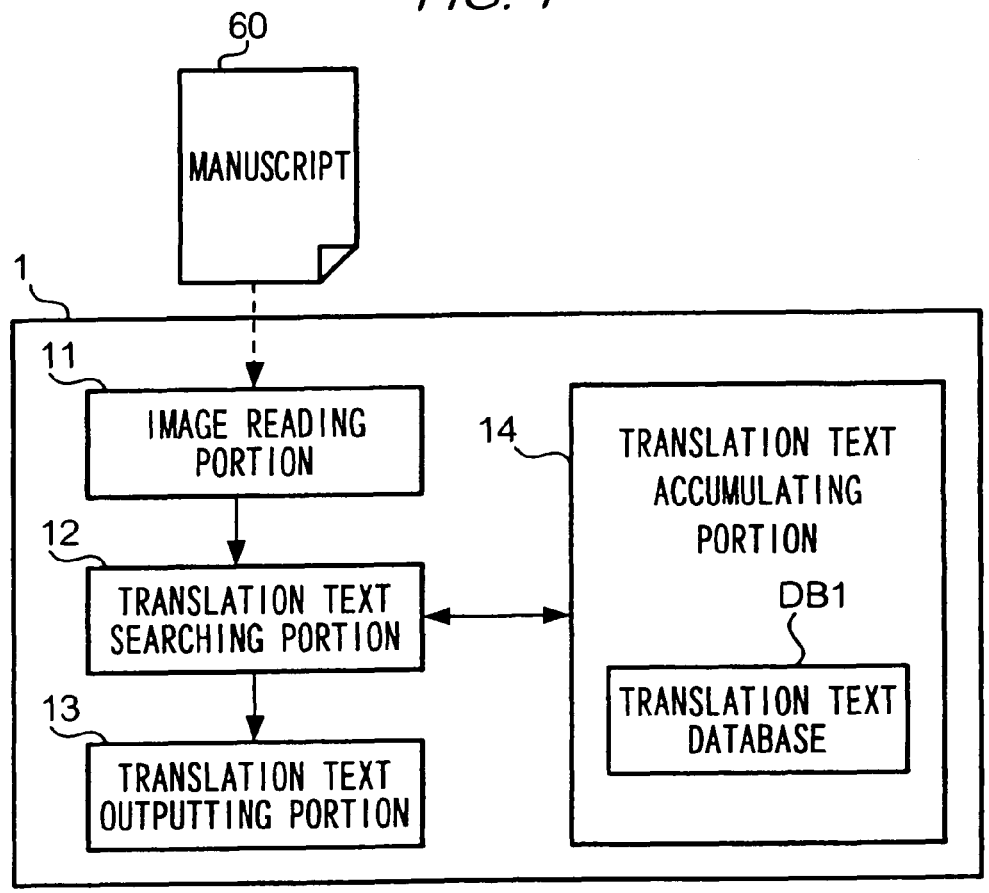
FIG. 1 is a block diagram showing a functional configuration of a translation system 1 according to a first embodiment.

FIG. 1 is a block diagram showing a functional configuration of a translation system 1 according to a first embodiment of the present invention. An image reading portion 11 optically reads a manuscript 60 and generates image data. A translation text searching portion 12 performs a character recognition process on the generated image data and generates text data. The translation text searching portion 12 searches for translation text in a translation text accumulating portion 14 based on the original text data generated by the character recognition process. Specifically, the translation text accumulating portion 14 stores a translation text database DB1 in which multiple translation texts are recorded. The translation searching portion 12 searches for a translation text which corresponds to the original text data in the translation text database DB1. A translation text outputting portion 13 outputs a translation text extracted from the translation text database DB1.

Figure 2:
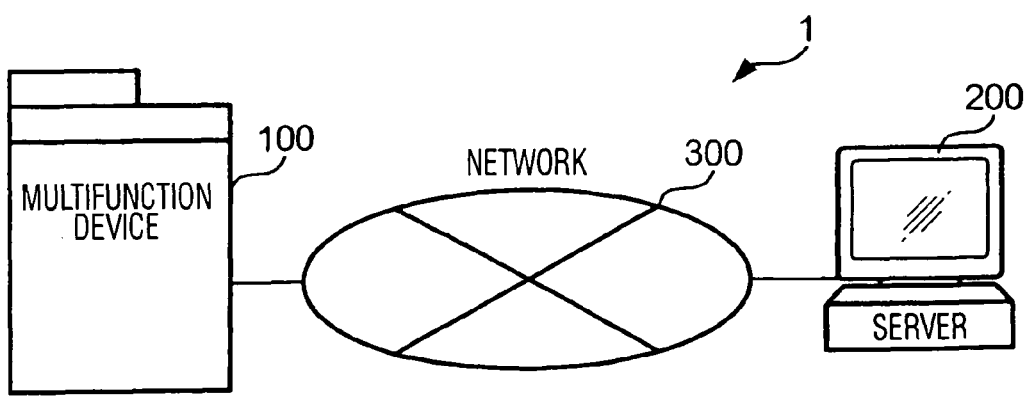
FIG. 2 is a diagram showing a configuration of the translation system 1.

FIG. 2 is a diagram showing a configuration of the translation system 1. The translation system 1 is made up of a multi-functional device 100 and a server 200. The multi-functional device 100 is a device provided with multiple functions including those of a copier, a printer, a scanner, a facsimile transceiver, a translation machine, and so on. The server 200 is a server device which provides translation texts to the compound device 100 which is a client device. The multi-functional device 100 and the server 200 are connected via a network 300, such as the Internet. Note that in FIG. 1, in order to prevent the diagram from becoming too complex, only one instance of the multi-functional device 100 and only one instance of the translation server 200 are shown, but the translation system 1 may possess multiple instances of the multi-functional device 100 and the server 200.

Figure 3:
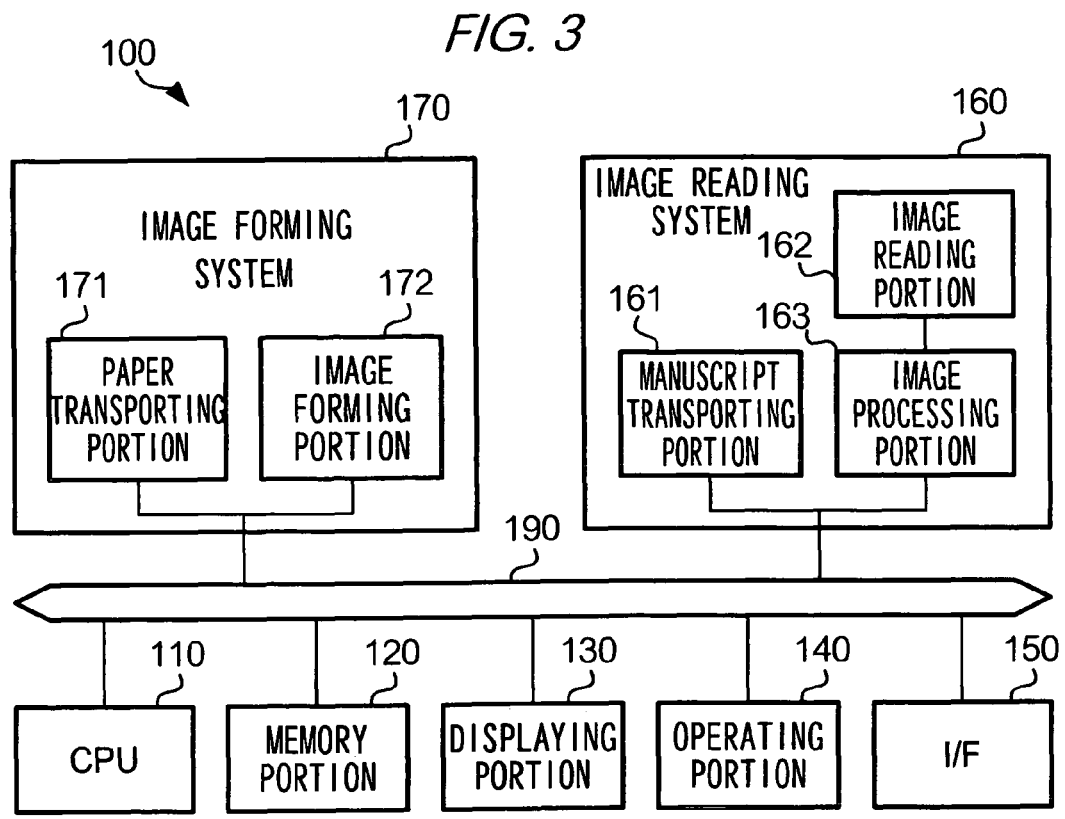
FIG. 3 is a block diagram showing a hardware configuration of a multi-functional device 100.

FIG. 3 is a block diagram showing a hardware configuration of the multi-functional device 100. The multi-functional device 100 is mainly made up of a control system including a CPU (Central Processing Unit) 110, an image reading system 160 that reads images of manuscripts, and an image forming system 170 that forms images on paper (a recording medium). The CPU 110 is provided with functionality to control the various component elements of the multi-functional device 100 by reading and executing control programs stored in a memory portion 120. The memory portion 120 is made up of a ROM (Read Only Memory), a RAM (Random Access Memory), a HDD (hard disk drive), and so on, and stores various control programs, translation programs, and other types of programs, as well as image data, text data, and other types of data. A displaying portion 130 and an operating portion 140 are a user interface. The displaying portion 130 is made up of, for example, a liquid crystal display, and displays images showing messages to a user, operating statuses, and so on, in accordance with control signals from the CPU 110. The operating portion 140 is made up of a numeric keypad, a start button, a stop button, a touch panel on the liquid crystal display, and so on, and outputs signals according to operations input by the user or display screens. The user can input commands to the multi-functional device 100 by operating the operating portion 140 while viewing images or message displayed by the displaying portion 130.

An interface 150 is an interface that performs transmission of control signals and data with the server 200 or other devices. The multi-functional device 100 can perform facsimile transmission by connecting to, for example, public telephone lines via the interface 150. Alternately, the multi-functional device 100 can perform transmission of electronic mail by connecting to a network such as the Internet via the interface 150.

The image reading system 160 is provided with a manuscript transporting portion 161 that transports a manuscript to a reading position, an image reading portion 162 that optically reads the manuscript at the reading position and generates an analog image signal, and an image processing portion 163 that converts the analog image signal into digital image data and performs any necessary image processing. The manuscript transporting portion 161 is a manuscript transporting device such as, for example, an ADF (Automatic Document Feeder). The image reading portion 162 is provided with a platen glass on which a manuscript is placed, a light source, a CCD (Charge Coupled Device) sensor, and other optical devices, and an optical system including lenses, mirrors, and so on (none of which is shown in the figures). The image processing portion 163 is provided with an A/D conversion circuit that performs digital-analog conversion and an image processing circuit that performs processes such as shading correction, color space conversion, and so on (none of which are shown in the figures).

An image forming system 170 is provided with a paper transporting portion 171 that transports paper to an image forming position and an image forming portion 172 that forms images on the transported paper. The paper transporting portion 171 is provided with a paper tray in which paper is stored, a transporting roller that transports paper from the paper tray to a prescribed position one sheet at a time, and so on (none of which are shown in the figures).

The image forming portion 172 is provided with a photoreceptor drum on which images are formed from, for example, YMCK-colored toners, a charger which charges the photoreceptor drum, an exposing device which forms a static electric image on the charged photoreceptor drum, a developing device that forms images from YMCK-colored toners on the photoreceptor drum, and so on (none of which are shown in the figures).

The above component elements are interconnected by a bus 190. For example, when image data is generated from a manuscript by the image reading system 160 and an image is formed on paper by the image forming system 170 in accordance with the generated image data, the multi-functional device 100 functions as a copier. When image data is generated from a manuscript by the image reading system 160 and the generated image data is output to another device via the interface 150, the multi-functional device 100 functions as a scanner. When an image is formed on paper by the image forming system 170 in accordance with image data received via the interface 150, the multi-functional device 100 functions as a printer. When facsimile data is generated from a manuscript by the image reading system 160 and the generated facsimile data is sent to a facsimile transceiver via the interface 150 or public telephone lines, the multi-functional device 100 functions as a facsimile transceiver. Alternately, when image data is generated from a manuscript by the image reading system 160, text data is further generated from the image data by a character recognition process, and a translation text of the text data is generated by executing a translation program, the multi-functional device 100 functions as a scanner translation machine.

Figure 4:
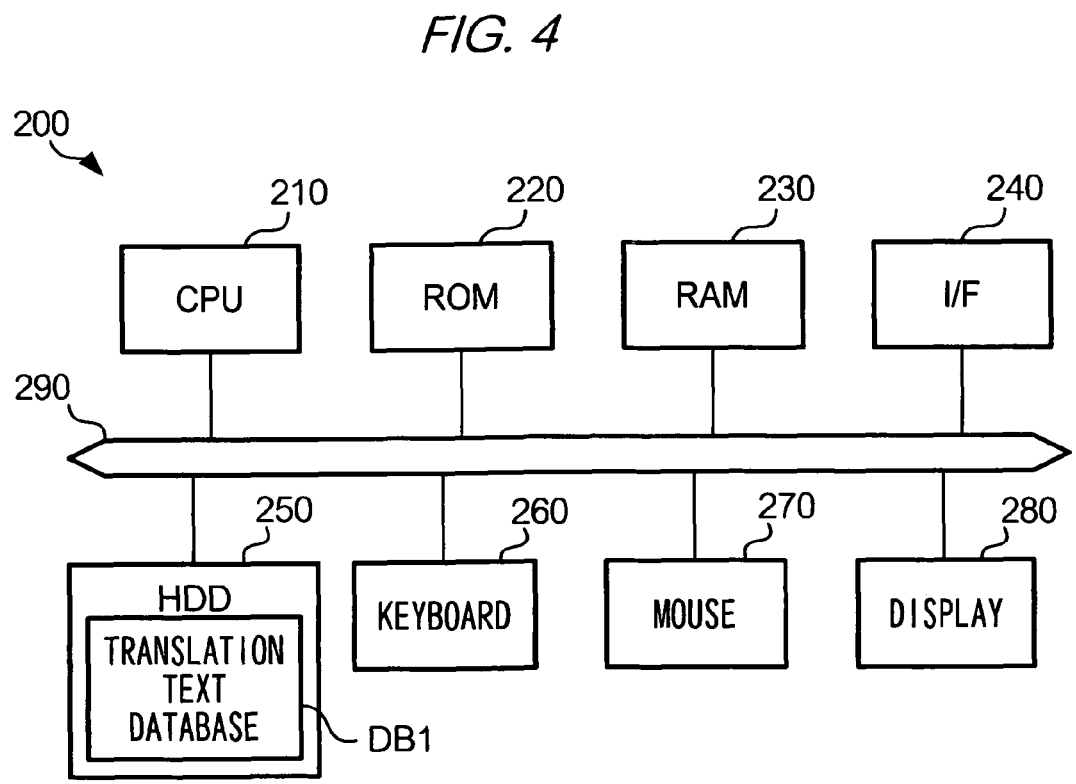
FIG. 4 is a diagram showing a hardware configuration of a server 200.

FIG. 4 is a diagram showing a hardware configuration of a server 200. A CPU 210 executes programs stored in a ROM 220 or a hard disk drive 250 using a RAM 230 as a work area. The hard disk drive 250 is a storage device that stores various types of programs and data. In the present embodiment, the hard disk drive 250 specifically stores the translation text database DB1 (described below). The user can perform data input and other operations to the server 200 by operating a keyboard 260 and a mouse 270. The server 200 is connected to a scanner 100 via an interface 240 and can send and receive data to and from the scanner 100. A display 280 displays images or messages indicating execution results of programs, and so on, under the control of the CPU 210. These component elements are interconnected by a bus 290.

FIG. 5 is a diagram showing an example of content of a translation text database DB1. The translation text database DB1 is a database which is provided with the following three data fields: "document identifier," "language," and "translation text." Document identifiers that specify content of translation texts are stored in the "document identifier" field. The document identifiers have the same value if the content of a text is the same, regardless of the language the text is written in. Language identifiers that specify the language of translation texts are stored in the "language" field. In the example in FIG. 5, "JP," "EN," "DE," and "FR" indicate Japanese, English, German, and French, respectively. Text (translation text) written in the language indicated by the language identifier is stored in the "translation text" field.

Data in the translation text database DB1 may be input ahead of time by operating the keyboard 260, the mouse 270, and so on. Alternately, data input or generated by a different device may be received via the interface 240 and stored. Alternately, the server 200 may generate a translation text by a translation program and so on itself and store that ahead of time.

FIG. 6 is a flowchart showing operation of the translation system 1. First, a user sets a manuscript 60 on the platen glass or the ADF. The displaying portion 130 displays a menu screen for inputting commands to the multi-functional device 100. The user operates the operating portion 140 while viewing the menu screen and inputs a command to translate the manuscript 60. The translation command contains information that specifies the translation source language and the translation target language. When a translation command is input, the multi-functional device 100's CPU 110 reads the image of the manuscript 60 (Step S110). Specifically, the CPU 110 controls the image reading system 160 and generates image data of the manuscript 60. The CPU 110 stores the generated image data to the memory portion 120. Next, the CPU 110 performs a character recognition process on the generated image data and generates original text data (Step S120). The CPU 110 stores the original text data generated by the character recognition process to the memory portion 120.

Next, the CPU 110 searches for a translation text in the translation text database DB1 (Step S130). Specifically, the following happens. First, the CPU 110 extracts the document identifier from the original text data. In the present embodiment, the manuscript 60 contains information indicating a document identifier (e.g., a character string such as "document identifier: A000001"). The CPU 110 searches for the keyword "document identifier:" in the original text data. The CPU 110 extracts a predetermined number of characters (e.g., seven characters) following the character string "document identifier:" which was discovered by the search. The CPU 110 stores the extracted character string in the memory portion 120 as the document identifier for manuscript 60. The CPU 110 extracts information that specifies the translation target language from the input translation command. The CPU 110 stores the extracted information in the memory portion 120 as the language identifier that indicates the translation target language.

Next, the CPU 110 generates a translation text search request which contains the document identifier for the manuscript 60 and the language identifier which indicates the translation target language. The CPU 110 sends the generated translation text search request to the sever 200 via the interface 150.

When the translation text search request is received, the server 200's CPU 210 stores the received translation text search request in the RAM 230. The CPU 210 extracts the document identifier and the language identifier from the translation text search request. The CPU 210 searches for a translation text in the translation text database DB1, using the extracted document identifier and language identifier as search keys. The CPU 210 extracts the translation text data discovered through the search as the translation text that corresponds to the translation text search request. The CPU 210 stores the extracted translation text data to the memory portion 230. The CPU 210 generates a translation text search response that contains the document identifier and the extracted translation text data. The CPU 210 sends the generated translation text search response to the multi-functional device 100, which is the origin from where the translation text search request was sent.

When the translation text search response is received, the multi-functional device 100's CPU 110 stores the received translation text search response in the RAM 120. The CPU 110 extracts the document identifier and the translation text data from the translation text search response. The CPU 110 stores the extracted document identifier and the translation text data to the memory portion 120. The CPU 110 determines whether the extracted document identifier matches the document identifier of the original text data which is being processed. If both document identifiers match, the CPU 110 stores the received translation text data in the memory portion 120 as the translation text corresponding to the original text data to be processed. If both document identifiers do not match, the CPU 110 sends a resend request to the server 200 indicating this. When the server 200 receives the resend request, the server 200 searches for a translation text, just as for the translation text search request, and sends the translation text to the multi-functional device 100.

Next, the CPU 110 outputs the translation text (Step S140). Specifically, the CPU 110 generates image data from the translation text data stored in the memory portion 120. The CPU 110 stores the generated image data to the memory portion 120. The CPU 110 forms images on paper according to the image data, by controlling the image forming system 170. The translation text is printed on the paper. Alternately, the CPU 110 may send the generated translation text data to another PC, etc., via the interface 150.

As described above, with a multi-functional device 100 according to the present embodiment, a user can obtain a paper on which a translation text is printed simply by setting a manuscript in the multi-functional device 100 and inputting a command to perform a translation process. The translation obtained here is translated ahead of time by a human translator. Accordingly, the user can obtain a high-quality translation in a short time.

If the translation text which was the subject of the translation text search request in the translation text search process by the server 200 was not present in the translation text database DB1, the CPU 210 reads and executes a translation program from the hard disk drive 250. The CPU 210 generates translation text data for the original text data by executing the translation program. The CPU 210 adds the generated translation text data to the translation text database DB1. The CPU 210 sends the generated translation text data to the multi-functional device 100. Alternately, the CPU 210 may send a message to the multi-functional device 100 notifying that no translation text for the requested original was present.

In the above first embodiment, an aspect was described in which document identification information is extracted from the manuscript 60 by the character recognition process, but the aspect in which the document identification information is extracted is not limited to this. For example, the document identification information may be extracted by identifying a figure such as a barcode using an image process. Alternately, the user may input the document identification information when inputting the command to perform the translation process.

Second Embodiment

Figures 7, 8:
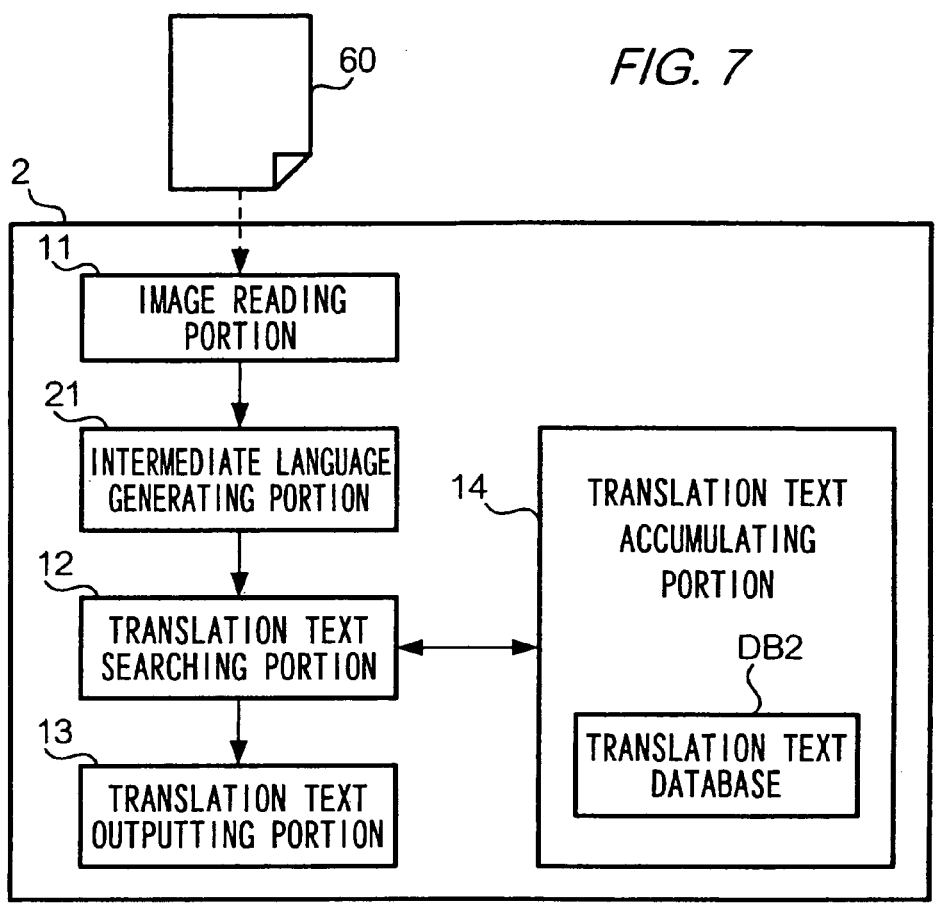
FIG. 7 is a block diagram showing a functional configuration of a translation system 2 according to a second embodiment.
FIG. 8 is a diagram showing an example of content of a translation text database DB2.

FIG. 7 is a block diagram showing a functional configuration of a translation system 2 according to a second embodiment of the present invention. The only points of difference between the translation system 2 and the translation system 1 according to the first embodiment are that an intermediate language generating portion 21 is provided and that the translation text accumulating portion 14 stores a translation text database DB2 instead of a translation text database DB1. The following description uses the same reference codes used to refer to component elements commonly shared with the first embodiment. No description is made of areas which are commonly shared with the first embodiment.

The intermediate language generating portion 21 performs a character recognition process on the image data generated from the manuscript 60 and generates original text data. The intermediate language generating portion 21 further generates intermediate language text data from the original text data. The intermediate language is a unique language for performing machine translation. Specifically, if a direct translation is attempted from the translation source language to the translation target language in a translation device which supports multiple translation source languages and translation target languages, a number of translation algorithms and translation dictionaries will need to be prepared equal to the number of combinations of translation source languages and translation target languages, thereby placing an excessive load on the translation device. The load can be lightened by performing translation via a common intermediate language.

The translation system 2, like the translation system 1, is made up of a multi-functional device 100 and a server 200. The hardware configuration of the multi-functional device 100 is the same as that shown in FIG. 3, so a description is omitted here. The hardware configuration of the server 200 is the same as that shown in FIG. 4, except that the hard disk drive 250 stores the translation text database DB2, so a description is omitted here.

FIG. 8 is a diagram showing an example of content of a translation text database DB2. The point of difference with the translation text database DB1 is that intermediate language texts are stored instead of document identifiers.

FIG. 9 is a flowchart showing operation of the translation system 2. As in the first embodiment, after performing the image reading process (Step S110) and the character recognition process (Step S120) on the manuscript 60, the multi-functional device 100's CPU 110 generates a translation text search request which contains the original text data and the language identifier which specifies the translation target language. The CPU 110 sends the generated translation text search request to the sever 200 via the interface 150.

When the translation text search request is received, the server 200's CPU 210 stores the received translation text search request in the RAM 230. The CPU 210 extracts the original text data and the language identifier for the translation target language from the translation text search request. The CPU 210 stores the extracted original text data and the language identifier to the RAM 230. The CPU 210 reads and executes an intermediate language generating program from the hard disk drive 250. The CPU 210 generates intermediate language text data from the original text data by executing the intermediate language generating program (Step S210). The CPU 210 stores the generated intermediate language text data (intermediate language text) to the RAM 230.

Next, the CPU 210 performs the translation text search process (Step S220). The CPU 210 searches for a translation text using a parameter which reflects the proximity between the intermediate language text generated from the original text and intermediate language text stored in the translation text database DB2. In the present embodiment, a distance d between the documents is used as the parameter reflecting the proximity between the two texts. The distance d is the parameter which indicates the divergence between the two texts. In other words, the closer the distance is—the smaller d is—the more similar the two texts are (and the higher the proximity is). For the technology to calculate the distance d between texts, technology which has been disclosed in JP H2003-271666A, JP H2003-271667, JP H2004-11061 A, and JP H2004-110200A can be used.

The CPU 210 determines whether the calculated distance d is equal to or lower than a threshold value. The hard disk drive 250 stores a threshold value $d_{th}$ for the distance between two texts. If $d \leq d_{th}$, the CPU 110 determines that the two texts are the same. The CPU 110 extracts the translation text which corresponds to the translation target language in the translation text database DB2. The following process to output the translation text (Step S140) is the same as that described in the first embodiment, so the description is omitted here.

With a multi-functional device 100 according to the present embodiment, a user can obtain a paper on which a translation text is printed simply by setting a manuscript in the multi-functional device 100 and inputting a command to perform a translation process. The translation obtained here is translated ahead of time by a human translator. Accordingly, the user can obtain a high-quality translation in a short time. The manuscript 60 does not need to contain document identification information specifying its content, as described in the first embodiment. Accordingly, the present invention can be applied to general manuscripts.

In the above second embodiment, an aspect was described in which translation texts and intermediate language texts are associated and stored ahead of time in a translation text database DB2, but the translation text database DB2 does not need to store intermediate language text data. In this case, the server 200's CPU 210 may generate an intermediate language text from the translation text by executing an intermediate language generating program and search for a translation text by calculating a distance d between the intermediate language text generated from the translation text and the intermediate language text generated from the original text.

Other Embodiments

Many variations on embodiments of the present invention are possible, and are not limited to the embodiments described above.

For example, the executing bodies of the processes shown in FIG. 6 and FIG. 9 are not limited to those described in the above embodiments. All or part of the processes performed by the multi-functional device 100 as described above may be executed by the server 200. Alternately, all or part of the processes performed by the server 200 as described above may be executed by the multi-functional device 100.

In the above embodiments, an aspect was described in which the translation system is made up of the multi-functional device 100 and the server 200 connected via the network 300, but the translation system may be configured from a single device. In other words, the multi-functional device 100 may be configured to be provided with all the functions described above.

The present invention provides a translation system including: an image reading unit that optically reads an image of a manuscript and generates image data; an inputting unit that inputs a translation target language; a character recognizing unit that generates an original text by performing a character recognition process on the image data generated by the image reading unit; a translation text database in which are associated and stored translation texts, language identifiers which specify languages in which the translation texts are written, and document identifiers which specify content of the translation texts; an extracting unit that extracts the document identifier which specifies the content of the original text from the original text; a searching unit that searches the translation text database for a translation text associated with a document identifier identical to the document identifier extracted from the original text by the extracting unit and a language identifier identical to the language identifier which specifies the translation target language input by the inputting unit; and an outputting unit that outputs the translation text searched by the searching unit.

The present invention further provides a translation system including: an image reading unit that optically reads an image of a manuscript and generates image data; an inputting unit that inputs a translation target language; a character recognizing unit that generates an original text by performing a character recognition process on the image data generated by the image reading unit; a translation text database in which are associated and stored translation texts, language identifiers which specify languages in which the translation texts are written, and intermediate language texts generated from the translation texts; an intermediate language generating unit that translates the original text into an intermediate language and generates an intermediate language text; a proximity calculating unit that calculates the proximity between the intermediate language text obtained by the intermediate language generating unit and the intermediate language text stored in the translation text database; and a searching unit that searches the translation text database for a translation text whose proximity calculated by the proximity calculating unit satisfies a prescribed condition and which is associated with a language identifier identical to the language identifier which specifies the translation target language input by the inputting unit.

In this translation system, the prescribed condition may be the condition that a minimum value of the proximities calculated by the proximity calculating unit be not greater than a threshold value. With this translation process, it is possible to make effective use of translation texts accumulated until that point and translated by human translators.

According to an embodiment of the present invention, any of the above translation systems may further include a notifying unit for notifying that the searching unit can find no translation texts satisfying the condition in the translation text database, if that is the case.

According to another embodiment of the present invention, any of the above translation systems may further include a translating unit that generates a translation text by translating the original text into the translation target language if no translation texts satisfying the condition can be found in the translation text database.

The present invention further provides a translation method for translating a manuscript according to a translation text database in which are associated and stored translation texts, language identifiers which specify languages in which the translation texts are written, and document identifiers which specify content of the translation texts, the method including optically reading an image of a manuscript and generates image data; inputting a translation target language; generating an original text by performing a character recognition process on the image data; extracting from the original text a document identifier which specifies the content of the original text; searching the translation text database for a translation text associated with a document identifier identical to the document identifier extracted from the original text by the extracting step and a language identifier identical to the language identifier which specifies the translation target language input by the inputting unit; and outputting the searched translation text.

The present invention further provides a storage medium storing a program that lets a computer device execute the above translation method.

The present invention further provides a translation method for translating a manuscript according to a translation text database in which are associated and stored translation texts, language identifiers which specify the languages in which the translation texts are written, and intermediate language texts generated from the translation texts, the method including optically reading an image of a manuscript and generates image data; inputting a translation target language; generating an original text by performing a character recognition process on the image data; generating an intermediate language text by translating the original text into an intermediate language; calculating the proximity between the intermediate language text and the intermediate language text; and searching the translation text database for a translation text whose proximity satisfies a prescribed condition and which is associated with a language identifier identical to the language identifier which specifies the translation target language input by the inputting unit.

The present invention further provides a storage medium storing a program that lets a computer device execute the above translation method.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments, and with the various modifications as are suited to the particular use contemplated. It is intended that the scope of the invention be defined by the following claims and their equivalents.

The entire disclosure of Japanese Patent Application No. 2005-65962 filed on Mar. 9, 2005 including specification, claims, drawings and abstract is incorporated herein by reference in its entirety.

What is claimed is:

1. A translation system comprising:
    an image reading unit that optically reads an image of a manuscript and generates image data;
    an inputting unit that inputs a translation target language;
    a character recognizing unit that generates an original text by performing a character recognition process on the image data generated by the image reading unit;
    a translation database that stores translation phrases in a plurality of languages, language identifiers that specify the language in which each individual translation phrase is written, and document identifiers that identify a content of the translation phrase regardless of the language in which the translation phrase is written;
    an extracting unit that extracts the document identifier which specifies the content of the original text from the original text;
    a searching unit that searches the translation database for a translation text associated with a document identifier identical to the document identifier extracted from the original text by the extracting unit and a language identifier identical to the language identifier which specify the translation target language input by the inputting unit; and
    an outputting unit that outputs the translation text searched by the searching unit
    wherein if the translation text associated with the document identifier is not found in the translation database, the original text is translated to generate a translation text for the original text and the language identifier, the document identifier, and the generated translation text are automatically stored in the translation database.

2. The translation system according to claim 1, further comprising a notifying unit that notifies that the searching unit can find no translation phrases that satisfy the condition in the translation database, if none can be found.

3. The translation system according to claim 1, further comprising a translating unit that generates a translation phrase by translating the original text into the translation target language if no translation texts satisfying the condition can be found in the translation database.

4. A translation system comprising:
    an image reading unit that optically reads an image of a manuscript and generates image data;
    an inputting unit that inputs a translation target language;
    a character recognizing unit that generates an original text by performing a character recognition process on the image data generated by the image reading unit;
    a translation database that stores translation phrases in a plurality of languages, language identifiers that specify the language in which each individual translation phrase is written, and intermediate language texts generated from the translation phrases;
    an intermediate language generating unit that translates the original text into an intermediate language and generates an intermediate language text;
    a proximity calculating unit that calculates the proximity between the intermediate language text obtained by the intermediate language generating unit and the intermediate language text stored in the translation database; and a searching unit that searches the translation database for a translation text whose proximity calculated by the proximity calculating unit satisfies a prescribed condition and which is associated with a language identifier identical to the language identifier which specify the translation target language input by the inputting unit, wherein if the translation text associated with the document identifier is not found in the translation database, the original text is translated to generate a translation text for the original text and the language identifier, the document identifier, and the generated translation text are automatically stored in the translation database.

5. The translation system according to claim 4, wherein the prescribed condition is the condition that a minimum value of the proximities calculated by the proximity calculating unit be not greater than a threshold value.

6. The translation system according to claim 4, further comprising a notifying unit that notifies that the searching unit can find no translation phrases that satisfy the condition in the translation database, if none can be found.

7. The translation system according to claim 4, further comprising a translating unit that generates a translation phrase by translating the original text into the translation target language if no translation texts satisfying the condition can be found in the translation database.

8. A translation method for translating a manuscript according to a translation database that stores translation phrases in a plurality of languages, language identifiers that specify the language in which each individual translation phrase is written, and document identifiers that identify a content of the translation phrase regardless of the language in which the translation phrase is written, the method comprising:

optically reading an image of a manuscript and generates image data;

inputting a translation target language;

generating an original text by performing a character recognition process on the image data;

extracting from the original text a document identifier that identifies a content of the original text regardless of the language in which the original text is written;

searching the translation database for a translation text associated with a document identifier identical to the document identifier extracted from the original text by the extracting step and a language identifier identical to the language identifier which specifies the input translation target language; and outputting the searched translation text, wherein if the translation text associated with the document identifier is not found in the translation database, the original text is translated to generate a translation text for the original text and the language identifier, a document identifier, and the generated translation text are automatically stored in the translation database.

9. A translation method for translating a manuscript according to a translation database that stores translation phrases in a plurality of languages, language identifiers that specify the language in which each individual translation phrase is written, and intermediate language texts generated from the translation phrases, the method including:

optically reading an image of a manuscript and generates image data;

inputting a translation target language;

generating an original text by performing a character recognition process on the image data;

generating an intermediate language text by translating the original text into an intermediate language;

calculating the proximity between the intermediate language text and the intermediate language text; and searching the translation database for a translation text whose proximity satisfies a prescribed condition and which is associated with a language identifier identical to the language identifier which specifies the input translation target language, wherein if the translation text associated with the document identifier is not found in the translation database, the original text is translated to generate a translation text for the original text and the language identifier, the document identifier, and the generated translation text are automatically stored in the translation database.

10. A storage medium readable by a computer, the storage medium storing a program of instructions executable by a computer device, the computer device including a translation database that stores translation phrases in a plurality of languages, language identifiers that specify the language in which each individual translation phrase is written, and document identifiers that identify a content of the translation phrase regardless of the language in which the translation phrase is written, the program comprising:

an image reading step that optically reads an image of a manuscript and generates image data;

an inputting step that inputs a translation target language;

a character recognizing step that generates an original text by performing a character recognition process on the image data;

an extraction step that extracts from the original text a document identifier that identifies a content of the original text regardless of the language in which the original text is written;

a searching step that searches the translation database for a translation text associated with a document identifier identical to the document identifier extracted from the original text by the extracting step and a language identifier identical to the language identifier which specifies the input translation target language; and an outputting step that outputs the translation text searched for in the searching step, wherein if the translation text associated with the document identifier is not found in the translation database, the original text is translated to generate a translation text for the original text and the language identifier, the document identifier, and the generated translation text are automatically stored in the translation database.

11. A storage medium readable by a computer, the storage medium storing a program of instructions executable by a computer device, the computer device including a translation database that stores translation phrases in a plurality of languages, language identifiers that specify the language in which each individual translation phrase is written, and intermediate language texts generated from the translation phrases, the program comprising:

an image reading step that optically reads an image of a manuscript and generates image data;

an inputting step that inputs a translation target language;

a character recognizing step that generates an original text by performing a character recognition process on the image data;

an intermediate language generating step that translates the original text into an intermediate language and generates an intermediate language text;

a proximity calculating step that calculates the proximity between the intermediate language text and the intermediate language text stored in the translation database; and a searching step that searches the translation database for a translation text whose proximity satisfies a prescribed condition and which is associated with a language identifier identical to the language identifier which specifies the input translation target language, wherein if the translation text associated with the document identifier is not found in the translation database, the original text is translated to generate a translation text for the original text and the language identifier, a document identifier, and the generated translation text are automatically stored in the translation database.

* * * * *